US006622133B1

(12) United States Patent
Park et al.

(10) Patent No.: US 6,622,133 B1
(45) Date of Patent: Sep. 16, 2003

(54) SYSTEM AND METHOD FOR AUTOMATIC MAIL OPERATION WITH FOUR STATE BARCODE

(75) Inventors: Moon Sung Park, Taejon (KR); Dong Chin Woo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/438,824

(22) Filed: Nov. 12, 1999

(30) Foreign Application Priority Data

Nov. 12, 1998 (KR) ........................................... 98-48437

(51) Int. Cl.[7] .......................... G06F 19/00; G06K 19/06

(52) U.S. Cl. ........................ 705/401; 705/408; 705/410

(58) Field of Search ................................ 705/401, 400, 705/408, 404, 410; 235/379, 462.1; 209/583, 584, 900

(56) References Cited

U.S. PATENT DOCUMENTS 4,733,368 A * 3/1988 Morimoto et al. ............. 704/5
4,992,650 A * 2/1991 Somerville ............... 235/462.1
5,058,187 A * 10/1991 Kim ........................... 358/1.9
5,249,687 A * 10/1993 Rosenbaum et al. ........ 209/900
5,324,893 A * 6/1994 Manduley et al. .......... 705/407
5,420,403 A 5/1995 Allum et al. ............... 235/375
5,479,515 A * 12/1995 Longacre, Jr. ......... 235/462.16
5,602,382 A * 2/1997 Ulvr et al. .................. 235/375
5,712,787 A * 1/1998 Yeung ......................... 705/408
5,734,568 A * 3/1998 Borgendale et al. ........... 705/1
5,818,031 A * 10/1998 Endoh ................... 235/462.01
6,042,011 A * 3/2000 Park et al. ............. 235/462.01

FOREIGN PATENT DOCUMENTS

EP 0529966 A1 * 3/1993

OTHER PUBLICATIONS

Anonymous author, "Brief Transmission: UK Post Office to barcode mail", Jul. 25, 1994, Telecomworldwide, p1.*
Anonymous Author, "Going the American Way", May 1994, Royal Mail–UK, v47n10, pp. 72.*
Tyler, Geoff, "A right Royal Mail", Sep. 1993, British Post Office, v37n9, pp. 26–27.*
Stromeyer, J. and Nice, J., "Carrier Sequence Bar Code Sorter," *United States Postal Service Advanced Technology Conference*, vol. 2, pp. 1061–1074, Nov. 1992.

* cited by examiner

*Primary Examiner*—Thomas A. Dixon
*Assistant Examiner*—Richard Woo
(74) *Attorney, Agent, or Firm*—Seed IP Law Group PLLC

(57) ABSTRACT

A system and a method for automatic mail operation with four state barcode are provided. An automatic mail operation processing system with four state barcode in accordance with the present invention includes customer barcode supporting system, mail operation supporting system, and automatic sorting system. The customer barcode supporting system converts information into four state barcode and prints the barcode on mail and mail receiving form when a customer supplies the information. The information is necessary for shipping the mail. The mail operation supporting system receives the mail and the mail receiving form, determines postal fee, and reports result of receipt to the customer through the customer barcode supporting system. The automatic sorting system reads the four state barcode on the mail and sorts the mail automatically.

7 Claims, 6 Drawing Sheets

FIG. 5A

| | 4 ST 3 BAR | | | V[0] | V=0 | V[1] | V=1 | V[2] | V[3] |
|---|---|---|---|---|---|---|---|---|---|
| | C0 | C1 | C2 | | =(C0+3V)4^0+ (C1+3V)4^1+ (C2+3V)4^2 | Korea | =(C0+3V)4^0+ (C1+3V)4^1+ (C2+3V)4^2 | Japan1 | Japan2 |
| 0 | 0 | 0 | 0 | Not used | 0 | Not used | 63 | Not used | Not used |
| 1 | 1 | 0 | 0 | 1 | 1 | ㄱ | 64 | | |
| 2 | 2 | 0 | 0 | 2 | 2 | ㄴ | 65 | | |
| 3 | 3 | 0 | 0 | 3 | 3 | ㄷ | 66 | | |
| 4 | 0 | 1 | 0 | 4 | 4 | ㄹ | 67 | | |
| 5 | 1 | 1 | 0 | 5 | 5 | ㅁ | 68 | | |
| 6 | 2 | 1 | 0 | 6 | 6 | ㅂ | 69 | | |
| 7 | 3 | 1 | 0 | 7 | 7 | ㅅ | 70 | | |
| 8 | 0 | 2 | 0 | 8 | 8 | ㅇ | 71 | | |
| 9 | 1 | 2 | 0 | 9 | 9 | ㅈ | 72 | | |
| 10 | 2 | 2 | 0 | 0 | 10 | ㅊ | 73 | | |
| 11 | 3 | 2 | 0 | A | 11 | ㅋ | 74 | | |
| 12 | 0 | 3 | 0 | B | 12 | ㅌ | 75 | | |
| 13 | 1 | 3 | 0 | C | 13 | ㅍ | 76 | | |
| 14 | 2 | 3 | 0 | D | 14 | ㅎ | 77 | | |
| 15 | 3 | 3 | 0 | E | 15 | ㄲ | 78 | | |
| 16 | 0 | 0 | 1 | F | 16 | ㄸ | 79 | | |
| 17 | 1 | 0 | 1 | G | 17 | ㅃ | 80 | | |
| 18 | 2 | 0 | 1 | H | 18 | ㅆ | 81 | | |
| 19 | 3 | 0 | 1 | I | 19 | ㅉ | 82 | | |
| 20 | 0 | 1 | 1 | J | 20 | ㅏ | 83 | | |
| 21 | 1 | 1 | 1 | K | 21 | ㅑ | 84 | | |
| 22 | 2 | 1 | 1 | L | 22 | ㅓ | 85 | | |
| 23 | 3 | 1 | 1 | M | 23 | ㅕ | 86 | | |
| 24 | 0 | 2 | 1 | N | 24 | ㅗ | 87 | | |
| 25 | 1 | 2 | 1 | O | 25 | ㅛ | 88 | | |
| 26 | 2 | 2 | 1 | P | 26 | ㅜ | 89 | | |
| 27 | 3 | 2 | 1 | Q | 27 | ㅠ | 90 | | |
| 28 | 0 | 3 | 1 | R | 28 | ㅡ | 91 | | |
| 29 | 1 | 3 | 1 | S | 29 | ㅣ | 92 | | |
| 30 | 2 | 3 | 1 | T | 30 | ㅐ | 93 | | |
| 31 | 3 | 3 | 1 | U | 31 | ㅒ | 94 | | |
| 32 | 0 | 0 | 2 | V | 32 | ㅔ | 95 | | |
| 33 | 1 | 0 | 2 | W | 33 | ㅖ | 96 | | |
| 34 | 2 | 0 | 2 | X | 34 | ㅘ | 97 | | |
| 35 | 3 | 0 | 2 | Y | 35 | ㅙ | 98 | | |
| 36 | 0 | 1 | 2 | Z | 36 | ㅚ | 99 | | |
| 37 | 1 | 1 | 2 | a | 37 | ㅝ | 100 | | |
| 38 | 2 | 1 | 2 | b | 38 | ㅞ | 101 | | |
| 39 | 3 | 1 | 2 | c | 39 | ㅟ | 102 | | |
| 40 | 0 | 2 | 2 | d | 40 | ㅢ | 103 | | |

FIG. 5B

| | | | | | | | | | |
|---|---|---|---|---|---|---|---|---|---|
| 41 | 1 | 2 | 2 | e | 41 | ㄳ | 104 | | |
| 42 | 2 | 2 | 2 | f | 42 | ㄵ | 105 | | |
| 43 | 3 | 2 | 2 | g | 43 | ㄶ | 106 | | |
| 44 | 0 | 3 | 2 | h | 44 | ㄺ | 107 | | |
| 45 | 1 | 3 | 2 | i | 45 | ㄻ | 108 | | |
| 46 | 2 | 3 | 2 | j | 46 | ㄼ | 109 | | |
| 47 | 3 | 3 | 2 | k | 47 | ㄽ | 110 | | |
| 48 | 0 | 0 | 3 | l | 48 | ㄾ | 111 | | |
| 49 | 1 | 0 | 3 | m | 49 | ㄿ | 112 | | |
| 50 | 2 | 0 | 3 | n | 50 | ㅄ | 113 | | |
| 51 | 3 | 0 | 3 | o | 51 | | 114 | | |
| 52 | 0 | 1 | 3 | p | 52 | | 115 | | |
| 53 | 1 | 1 | 3 | q | 53 | | 116 | | |
| 54 | 2 | 1 | 3 | r | 54 | | 117 | | |
| 55 | 3 | 1 | 3 | s | 55 | | 118 | | |
| 56 | 0 | 2 | 3 | t | 56 | | 119 | | |
| 57 | 1 | 2 | 3 | u | 57 | | 120 | | |
| 58 | 2 | 2 | 3 | v | 58 | | 121 | | |
| 59 | 3 | 2 | 3 | w | 59 | | 122 | | |
| 60 | 0 | 3 | 3 | x | 60 | | 123 | | |
| 61 | 1 | 3 | 3 | y | 61 | | 124 | | |
| 62 | 2 | 3 | 3 | z | 62 | | 125 | | |
| 63 | 3 | 3 | 3 | CTRL | 63 | CTRL | 126 | CTRL | CTRL |

SYSTEM AND METHOD FOR AUTOMATIC MAIL OPERATION WITH FOUR STATE BARCODE

TECHNICAL FIELD

The present invention relates to a system and a method for automatic mail operation with four-state barcode. In particular, the system in accordance with the present invention applies priority to three four-state barcodes and therefore provides multi-language service and automatic sort processing.

BACKGROUND OF THE INVENTION

Conventionally, the postal code and the delivery sequence number have been used for automatic sort of mailings as a form of barcodes. Another code 39 barcodes are used for the post office work, which means two different barcode systems are employed, one for automatic sort of mailings and the other for office works. In other words, the barcodes of code 39 and the barcode for automatic sort of mailings are not compatible. The mailings employing code 39 by office workers cannot be applied to the automatic sorting system and therefore those mailings have been processed by manual work. The barcodes of code 39 are capable of containing information only about numbers and the structure of the system is complicated. Therefore, it takes relatively long time to make an input by customers.

The four state barcode printing and scanning system in accordance with the present invention creates a integrated system with a new barcode structure, in which four state barcodes are employed for automatic sort of mailings and office work. Four state barcodes are applied to process Information required for the office work like information regarding a sender, a receiver, customer's ID, service type, weight, etc. The barcodes are obtained by an automatic sort system and the processing time is supplied to an information system. Therefore, the four-state barcode printing and scanning system in accordance with the present invention provides convenient services and maintenance of mailings.

In four-state barcode system, which has been used for automatic sort of mailings, 4 barcodes are employed to make difference between the top and the bottom. A weight of 0, 1, 2, 3 is determined by the position of bars. If the value of barcode characters is bigger than 6, it is to be replaced by 0. Therefore, with 6×6 matrix, 10 numbers and 26 alphabets are represented. In Royal Mail of England, such a system has been extended. In Canada, Canada postal service uses a weight of 0, 1, 2, 3 for bars and numbers and alphabets are represented by the combination of bars. 64 barcode characters are used with the help of a 4 state 3 bar reference table and they contain information regarding automatic sort of mailings. The barcode system of code 39 is used to represent contents filled by customers at offices and for tracking service.

In addition, the barcode system of post offices should be capable of processing keywords, for example, the name of the customer. In conventional barcode information system, only alphabets and numbers have been available. Therefore, in countries where English is not able to express the unique features of their mother language, another barcode information structure has been required. In particular, in countries where English alphabets are not used, a separate barcode structure is required. For example, in Korea, a few graphemes are combined to form a character and therefore it is difficult to express many Hangul characters in conventional barcode systems.

SUMMARY OF THE INVENTION

A system and a method for automatic mail operation with four-state barcode are provided.

An automatic mail operation processing system with four-state barcode in accordance with the present invention includes customer barcode supporting system, mail operation supporting system, and automatic sorting system. The customer barcode supporting system converts information into four-state barcode and prints the barcode on mail and mail receiving form when a customer supplies the information. The information is necessary for shipping the mail. The mail operation supporting system receives the mail and the mail receiving form, determines postal fee, and reports result of receipt to the customer through the customer barcode supporting system. The automatic sorting system reads the four-state barcode on the mail and sorts the mail automatically.

Desirably, the information comprises number information and character information. The number information is expressed by two four-state barcodes and the character information is expressed by three four-state barcodes.

Desirably, the number information is expressed by two four-state barcodes and barcode values of the two four-state barcodes are obtained by following equation.

$$C_1 = int\left(\frac{Num}{4}\right)$$

$$C_0 = int(Num - 4C_1)$$

*Num*: number represented by barcodes

Desirably, the character information is expressed by three four-state barcodes and barcode values of the three four-state barcodes are obtained by following equation.

$$C_2 = int\left(\frac{Char_v - 63V}{4^2}\right)$$

$$C_1 = int\left(\frac{Char_v - 63V}{4} - 4C_2\right)$$

$$C_0 = int(Char_v - 63V - 4^2C_2 - 4C_1)$$

$Char_v$: code value assigned to characters $V$: priority information

Desirably, the priority information is expressed by a four-state bar or three four-state bars.

Desirably, the customer barcode supporting system includes customer address management means, four-state barcode reference table, four-state barcode generating means, and four-state barcode image printing means.

The customer address management means provides address information, service type, service level, quantity, and reference weight to the mail operation supporting system and receives postal code and delivery sequence number, address information, service type, service level, quantity, and reference weight provided by customer. The postal code and the delivery sequence number are obtained from the address information. The four-state barcode reference table stores barcode values of numbers and alphabets. The four-state barcode generating means converts information of mail receiving form and information of automatic sort into four state barcode characters in reference to the four-state barcode reference table. The four-state barcode image printing means prints the four state barcode characters on mail receiving form and mail.

Desirably, the four-state barcode generating means generates barcode characters for error correction with the four state barcode characters.

Desirably, the four-state barcode generating means adds the four-state barcode characters, divides result of the addition by 64, and expresses residue of the division with three four-state barcodes.

Desirably, the mail operation supporting system includes barcode reading means, measuring means, and mail window system. The barcode reading means receives mail and mail receiving form from the customer barcode supporting system and reads four state barcodes printed on the mail and the mail receiving form. The measuring means measures weight of the mail. The mail window system determines discount availability of postal fee on the basis of error occurrences in reading the four state barcode, calculates postal fee on the basis of the weight of the mail and result of the barcode reading means, confirms if the postal fee is paid, and provides the mail and information regarding the mail to the automatic sorting system.

Desirably, the automatic sorting system includes barcode reading means, storage means, and distributing means. The barcode reading means reads postal code and delivery sequence number of shipping address from number information section of four state barcode printed on the mail. The storage means stores the result of the barcode reading means. The distributing means distributes the mail on the basis of the postal code and the delivery sequence number.

An automatic mail operation processing method with four-state barcode following steps. The first step is to convert information into four-state barcode when a customer supplies the information. The information is necessary for shipping a mail. The second step is to print the four-state barcode on the mail and mail receiving form. The third step is to determine postal fee on the basis of service type of the mail, service level of the mail, weight of the mail, quantity of the mail, and status of reading the four-state barcode. The fourth step is to read four-state barcode printed on the mail receiving form, storing the four state barcode, and shipping mail when postal fee is paid. The fifth step is to sort the mail automatically on the basis of postal code information and delivery sequence number information extracted from four-state barcode. The four-state barcode is printed on the mail.

Desirably, the automatic mail operation processing method further includes a step for providing information regarding the sorted mail to arrival quantity planning system of place to where the mail is shipped.

Desirably, the first step is to convert the number information into two four-state barcodes and converting character information into three four-state barcodes with priority.

Desirably, the number information is expressed by two four-state barcodes and barcode values of the two four-state barcodes obtained by following equation.

$$C_1 = int\left(\frac{Num}{4}\right)$$
$$C_0 = int(Num - 4C_1)$$

*Num*: number represented by barcodes

Desirably, the character information is expressed by three four-state barcodes, barcode values of the three four-state barcodes obtained by following equation.

$$C_2 = int\left(\frac{Char_v - 63V}{4^2}\right)$$
$$C_1 = int\left(\frac{Char_v - 63V}{4} - 4C_2\right)$$
$$C_0 = int(Char_v - 63V - 4^2C_2 - 4C_1)$$

$Char_v$: code value assigned to characters $V$: priority information

Desirably, the priority information is expressed by a four-state bar or three four-state bars.

Desirably, the third step is to apply discount postal fee if errors occurred in reading barcode can be corrected or errors are not occurred in reading barcode and applying normal fee without discount if errors occurred in reading barcode cannot be corrected.

BRIEF DESCRIPTION OF THE DRAWINGS

The embodiments of the present invention will be explained with reference to the accompanying drawings, in which:

FIG. 5 is a barcode reference table shown in two continued FIGS. 5A and 5B, and used for generating four-state barcode.

DETAILED DESCRIPTION OF THE INVENTION

Four state barcode used in an embodiment of the present invention employs four state two bar to express numbers and employs three four-state bars to express characters other than numbers. For example, names and addresses are expressed by three four-state barcodes with priority and postal codes are expressed by two four-state barcodes and names.

In case of two four-state barcodes, $C_0$ and $C_1$ express barcodes for numbers. Following mathematical equation 1 describes $C_1$ and $C_0$.

$$C_1 = int\left(\frac{Num}{4}\right) \quad \text{[Equation 1]}$$
$$C_0 = int(Num - 4C_1)$$

*Num*: number represented by barcodes

In case of three four-state barcodes, $C_2$, $C_1$, and $C_0$ express barcodes for characters. Following mathematical equation 2 describes $C_2$, $C_1$, and $C_0$.

$$C_2 = int\left(\frac{Char_v - 63V}{4^2}\right) \quad \text{[Equation 2]}$$

$$C_1 = int\left(\frac{Char_v - 63V}{4} - 4C_2\right)$$

$$C_0 = int(Char_v - 63V - 4^2 C_2 - 4C_1)$$

$Char_v$: code value assigned to characters $V$: priority

C2, C1, and C0 values are obtained for each character and the values are used for four state character values. FIG. 5 is a barcode reference table used for generating four-state barcode. In the present invention, same three four-state barcodes are recognized differently if they have different priorities. As shown in FIG. 5, priority information is expressed by a four-state barcode. If priority V is zero, it means the character is alphanumeric. If priority V is one, it means the character is Korean. If priority V is two or three, it means the character is Japanese. The priority can be extended. That is, if three four-state barcodes system is used to express priority, the priority V is extended from 0 to 63. The location where character information is stored and the length of character information are fixed by protocol in information frame. If priority is only applied to the location where character information is stored, multi-language can be expressed by three four-state barcodes.

Figure 1:
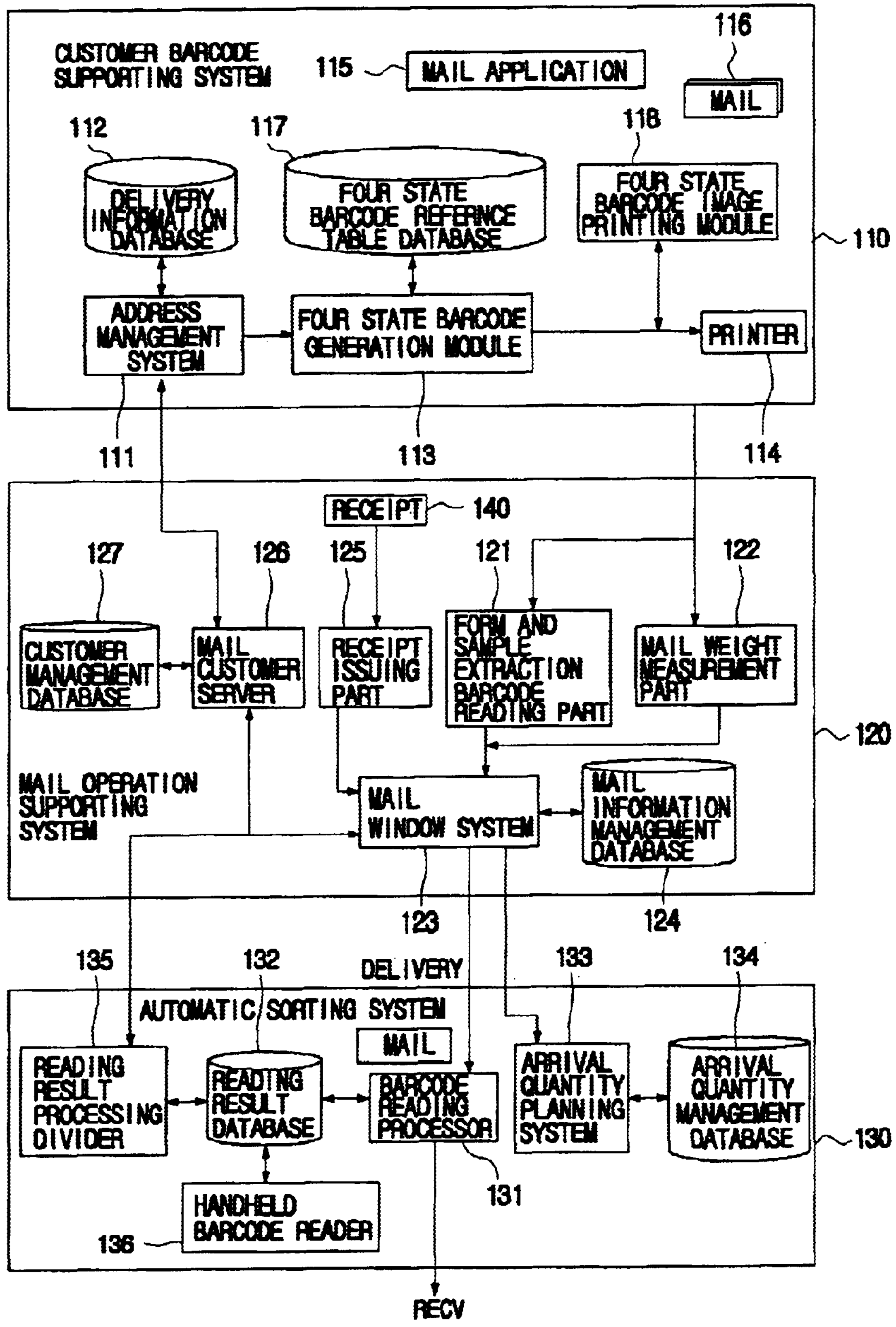
FIG. 1 is a diagram illustrating overall structure of a mail operation processing system with four state barcode in accordance with an embodiment of the present invention.

FIG. 1 is a diagram illustrating overall structure of a mail operation processing system with four state barcode in accordance with an embodiment of the present invention. The system includes a customer barcode supporting system 110, a mail operation supporting system 120, and an automatic sorting system 130. The mail operation supporting system 120 receives mails from customers. The automatic sorting system 130 automatically sorts the mails, reads barcode, and delivers the mails.

The customer barcode supporting system 110 includes address management system 111, delivery information database 112, four state barcode generation module 113, printer 114, four-state barcode reference table database 117, and four state barcode image printing module 118.

The mail operation supporting system 120 includes form and sample extraction barcode reading part 121, mail weight measurement part 122, mail window system 123, mail information management database 124, receipt issuing part 125, mail customer server 126, and customer management database 127.

The automatic sorting system 130 includes barcode reading processor 131, reading result database 132, arrival quantity planning system 133, arrival quantity management database 134, reading result processing divider 135, handheld barcode reader 136.

Customers access the customer barcode supporting system 110 by registering the address management system 111. Mail information such as type of service, quantity, date, and shipping address is manually or automatically provided. Shipping address information is provided to the mail customer server 126. The mail customer server 126 accesses the customer management database 127 with shipping address information and generates postal code and delivery sequence number. The postal code and the delivery sequence number are supplied to the address management system 111. The mail customer server 126 determines if discount is available and calculates fee. Information regarding the fee is supplied to the mail window system 123. Information regarding postal code and delivery sequence number is stored at the delivery information database 112.

The four-state barcode generation module 113 calculates barcode value $C_1$ and $C_0$ to express number information such as postal code and delivery sequence number. The four-state barcode generation module 113 calculates barcode value $C_2$, $C_1$, and $C_0$ to express character information. In addition, the four-state barcode generation module 113 generates check bits for checking errors. The check bits is generated by adding the barcode values and then divided by 64. The residue of the division is expressed by three four-state barcodes.

The four-state barcode reference table database 117 stores the number information, the character information, and the priority information. The four-state barcode image printing module 118 prints the number information, the character information, and the priority information with printer 114. In addition, the four-state barcode image printing module 118 prints barcode for automatic sort and customer information like customer id at particular position of mail envelops.

Once a mail 116 with four-state barcode and a mail application 115 is received, the mail operation supporting system 120 starts operation.

The form and sample extraction barcode reading part 121 reads four-state barcode. Number information is analyzed with two four-state barcodes unit and character information is analyzed with three four-state bars code unit. The three four-state barcodes reference table is used for analysis of priority information. The form and sample extraction barcode reading part 121 reads postal codes and delivery sequence number and converts postal codes automatically. The postal codes include postal code of sender and postal code of receiver. Also, the form and sample extraction barcode reading part 121 reads name information from the character information. The name information and the postal codes are supplied to the mail window system 123 automatically.

The mail window system 123 receives information regarding postal codes and name from the form and sample extraction barcode reading part 121. The mail window system 123 receives input information, received quantity of mails, weight information from the mail customer server 126. The mail customer server 126 weighs the mail by reference unit weight. Users supply the reference unit weight. The mail weight measurement part 122 measures weight.

The mail window system 123 reviews supplied information and calculates postal fee. The mail window system 123 sends information of mail id and postal fee to customers. Customers can pay the postal fee by various methods such as monthly payment, credit card, cash, check, and account at post office. The payment is processed as a separate process.

After the postal fee is paid, the mail is officially received. The receipt issuing part 125 issues a receipt 140 that stores information regarding the mail. Receipt id and other important information are printed on the receipt as a form of four-state barcode. The mail window system 123 stores the information at mail information management database 124 in order to manage received mail quantity.

The mail window system 123 provides the information to the arrival quantity planning system 133. The arrival quantity planning system 133 stores mail quantity information to the arrival quantity management database 134. The mail quantity information is used to anticipate expected quantity of mail for process planning.

The barcode reading processor 131 reads barcodes printed on mails. The information read from the barcode is used for automatic sort. In the reading process, the barcode reading processor 131 obtains quantity information by receiver's id and generates sorting time, id of delivery station or distributing station to store them to the reading result database 132.

If an error occurs in reading barcodes, barcode of mail is read with the help of the handheld barcode reader 136. The reading result processing divider 135 sends the result of barcode reading to the mail customer server 126 and the mail window system 123. Customers are able to access the mail customer server 126 and check mail processing statistics and fee specification.

Figure 2:
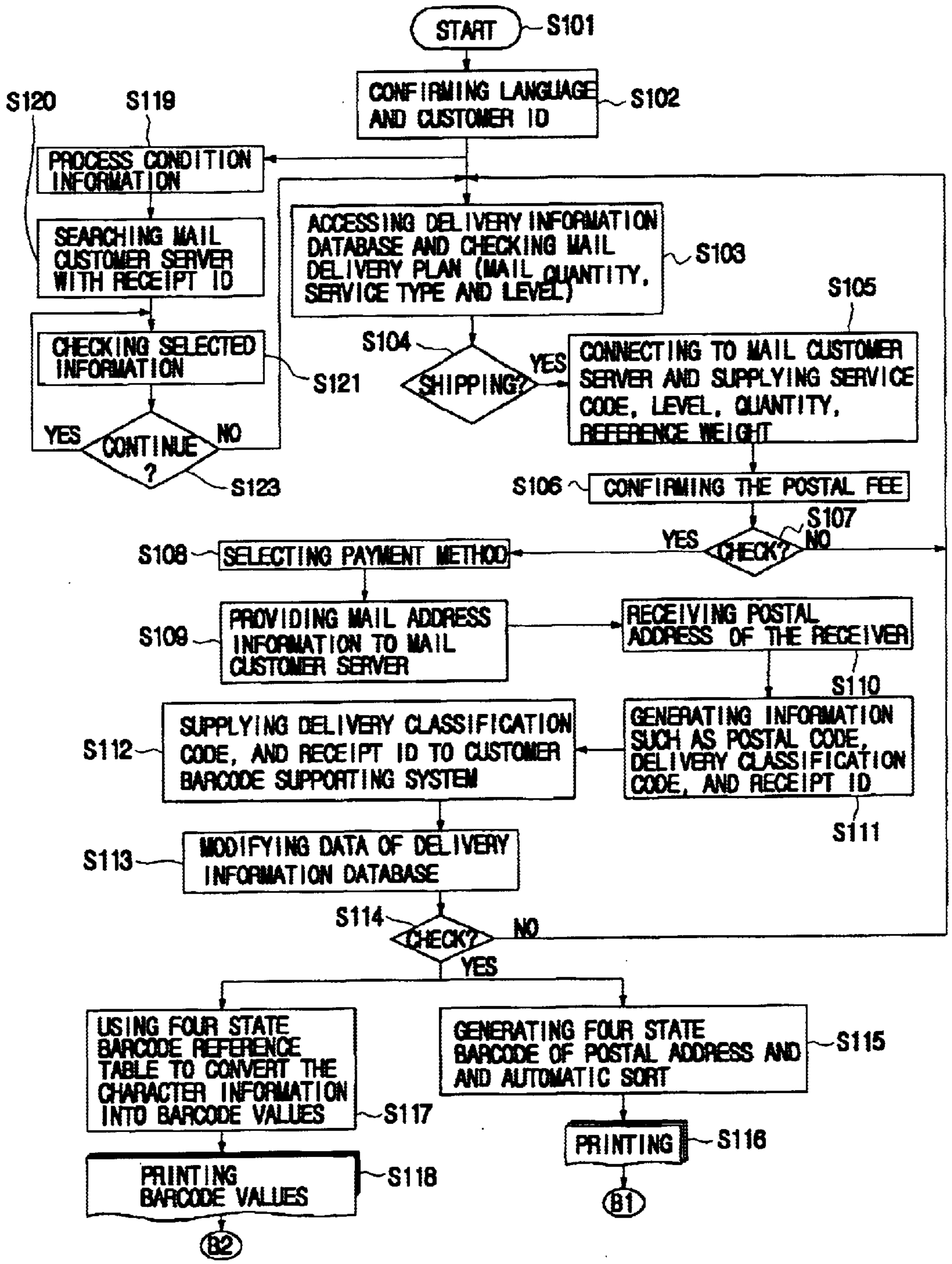
FIG. 2 is a flow diagram illustrating a customer barcode supporting system of mail operation processing system with four state barcode shown in FIG. 1.

FIG. 2 is a flow diagram illustrating a customer barcode supporting system of mail operation processing system with four-state barcode shown in FIG. 1.

The customer barcode supporting system performs processes for generating and delivering mails. Customers start the customer barcode supporting system at S101 and confirm language and customer id at S102. The language determines the priority that is used for generating and reading barcodes. Once the customer id is confirmed, delivery information database is accessed and mail delivery plan (mail quantity, service type and level) is checked at S103. If the mail doesn't need to be delivered, initial menu is executed. If the mail needs to be delivered, stage S105 is performed.

Customers access mail customer server and input service code, service level, quantity, and reference weight sequentially at stage S105. The mail customer server calculates postal fee and displays it. Customers confirm the postal fee at stage S106 and determine if the fee is appropriate at stage S107. If the fee is appropriate, payment method is selected at stage S108. Once the payment is made, mail address information is provided to the mail customer server at stage S109. If the mail customer server receives postal address of the receiver at stage S110, it generates information such as postal code, delivery classification code, and receipt id. In case of registered mail, registration number is assigned by the mail customer number.

The information such as postal code, delivery classification code, and receipt id is supplied to the customer barcode supporting system at stage S112. The customer barcode supporting system modifies data of delivery information database in reference to the information at stage S113. Customers check if modified information is correct at stage S114. If correct, number information and character information are printed on specified field in mail received form. If three four-state barcodes is printed, specified priority and four-state barcode reference table are referred to convert the character information into barcode values at stage S117. The barcode values are printed in reference to barcode image module at stage S118.

After the barcode values are printed, an envelope is supplied and four-state barcode of postal address and automatic sort is generated at stage S115. The four-state barcode of postal address and automatic sort is printed at stage S116. Process condition information S119 lets customers connect to the mail customer server and search with receipt id at stage S120. That is, when customers make connection with the mail customer server and supply receipt id, various information such as fee information, postal code, delivery classification information, and delivery status can be checked at stage S121.

Figure 3:
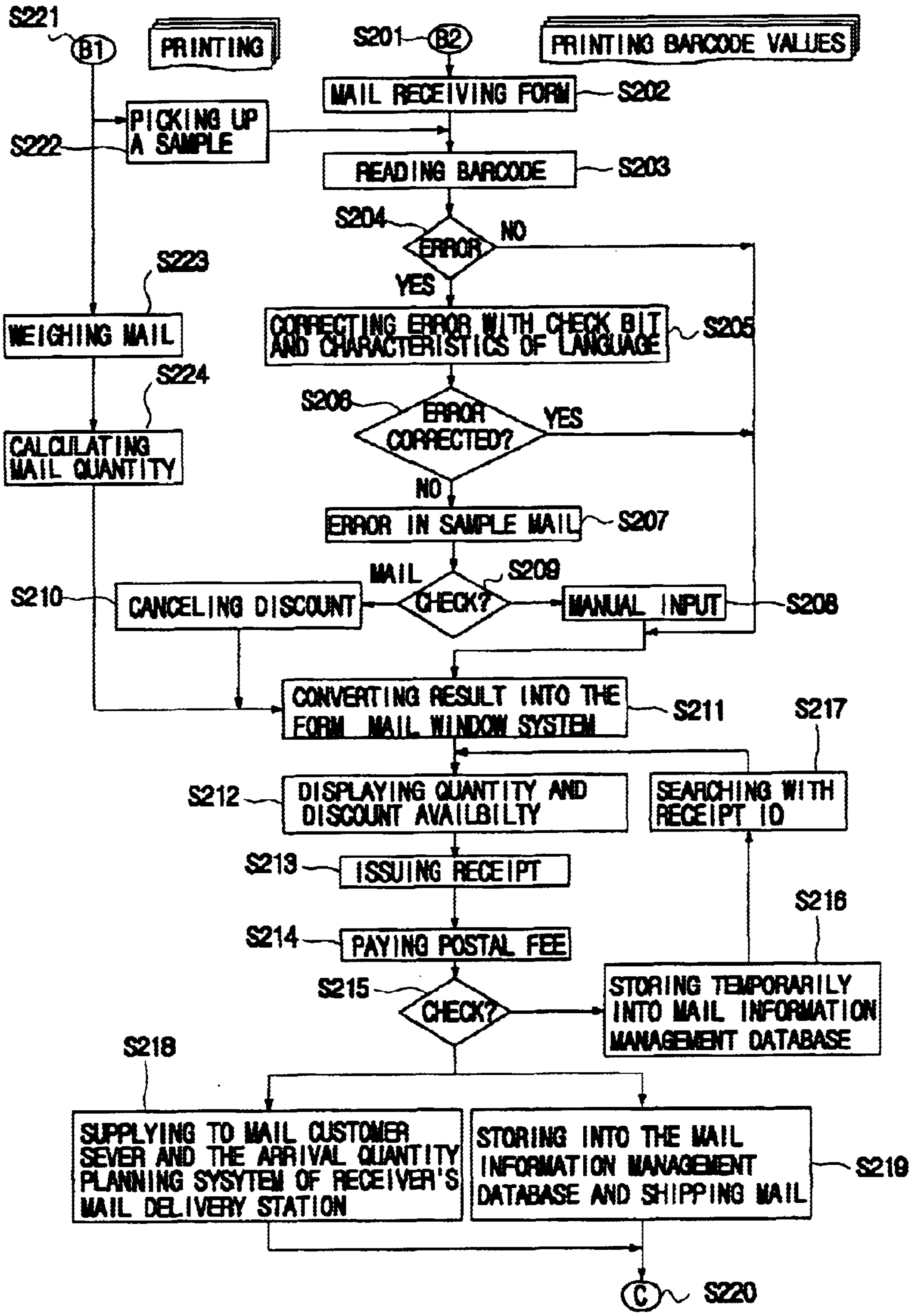
FIG. 3 is a flow diagram illustrating a mail operation supporting system of mail operation processing system with four state barcode shown in FIG. 1.

FIG. 3 is a flow diagram illustrating a mail operation supporting system of mail operation processing system with four-state barcode shown in FIG. 1.

If customers submit mails with mail application forms at stage S201, a sample is picked up at stage S222 and four-state barcode printed on the sample mail and the mail application form of the sample is read. Number information is analyzed with two four-state barcodes unit and character information is analyzed with three four-state barcodes unit. If errors are occurred in reading barcodes at stage S204, error position is detected and corrected with the help of check bits and characteristics of the letter at stage S205. In case of Korean, errors are corrected with the help of initial vowel, medial vowel, and final consonant.

If it turns out the errors cannot be corrected at stage S206 and the mail is a sample mail at stage S207, fee with discount is cancelled at stage S210. If the barcode with errors is confirmed at stage S209, a clerk at mail window manually input character information printed on the application form at stage S208.

On the contrary, errors are not occurred at stage S204 or errors are corrected at stage S206, character information and number information are converted into the form of the mail window system at stage S223. Once reading test for sample mail is completely done, weight is measured at stage S223 and mail quantity is calculated in reference to mail weight reference supplied by customer barcode supporting system at stage S224. Then, the result is provided to the mail window system. The result is also automatically converted into the form of mail window system at stage S211.

The mail window system displays information such as the mail quantity, condition of discount, testing result, and postal fee and issues receipt at stage S213. Also, the mail window system requires payment at stage S214 and checks if the customer pays the fee at stage S215. If the fee is not paid, the fact that the fee is not paid is stored into the mail information management database by application id at stage S216. If payment is delayed and therefore the application is postponed, search is performed by application id at stage S217 and stage S212 is performed.

If it is confirmed that the payment is made, application complete information is stored into the mail information management database and then mail is shipped at stage S219. The application complete information is supplied to the mail customer server and the arrival quantity planning system of receiver's mail delivery station at stage S218. That is, after the automatic mail operation system in accordance with the present invention prints barcodes including the application complete information, the mail is delivered to the receiver's mail delivery station.

Figure 4:
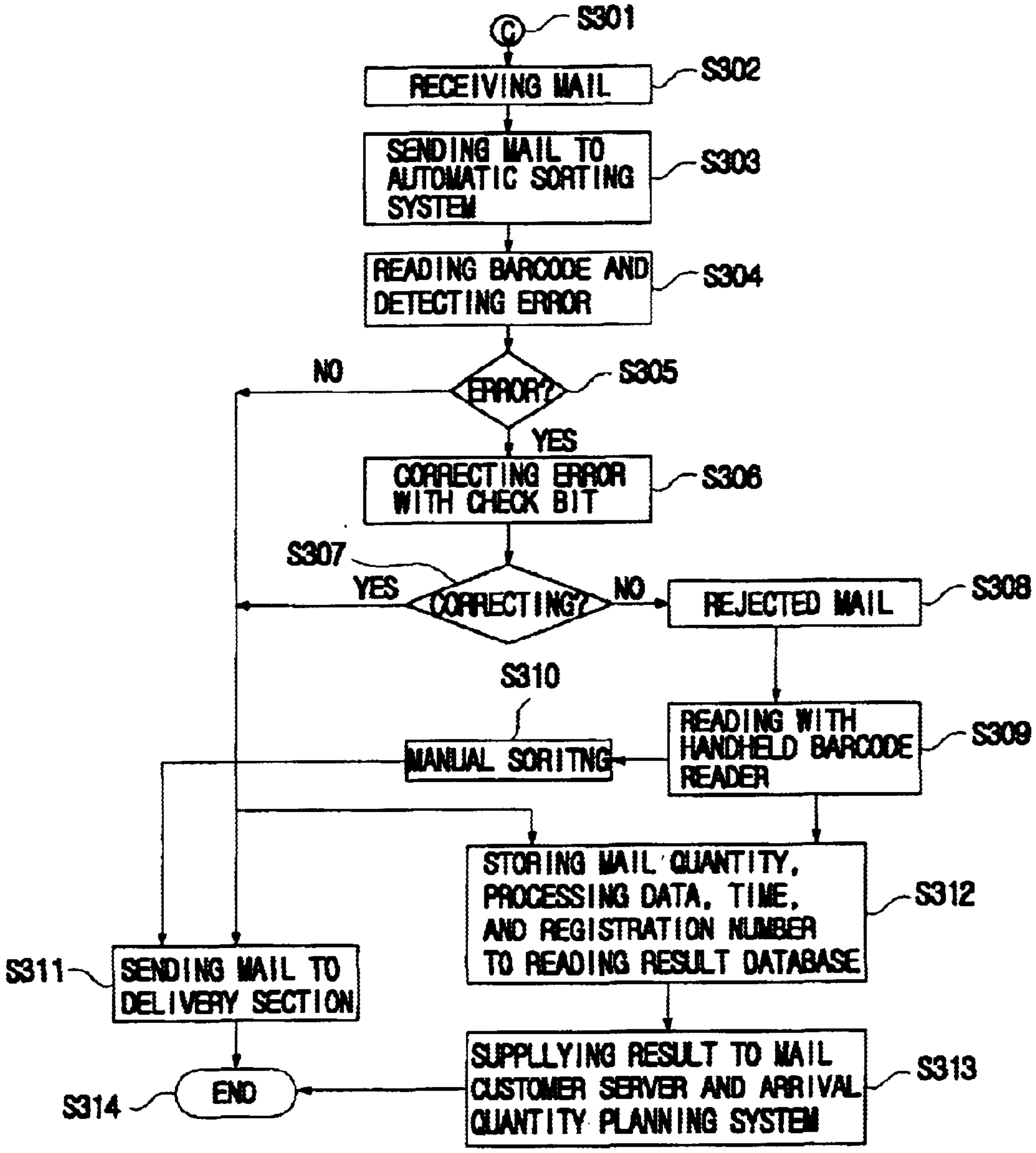
FIG. 4 is a flow diagram illustrating an automatic sorting system of mail operation processing system with four state barcode shown in FIG. 1.

FIG. 4 is a flow diagram illustrating an automatic sorting system of mail operation processing system with four state barcode shown in FIG. 1.

The mail operation supporting system receives mail quantity information. The mail window system receives the mail quantity information at stage S301. Arrived mails are received at stage S302. Receipt of the mail is confirmed and the mail is sent to the automatic sorting system at stage S303. The automatic sorting system reads barcodes sequentially and detects any errors in the reading process. If errors are detected at stage S305, the errors are corrected by check bits and language characteristics at stage S306. If it is determined that errors cannot be corrected at stage S307, the mail is sent to the section where the automatic sorter cannot operate at stage S308. The barcode printed on the mail is read by the handheld barcode reader at stage S309 and classified manually at stage S310. Then, the mail is sent to the delivery section at stage S311.

If errors are not detected at stage S305 or all of the errors are corrected at stage S307, the mail is sent to the delivery section automatically at stage S311.

Barcode information including mail quantity, processing date, time, and registration number is stored at the reading result database by the customer id at stage S312. At stage S313, the processing result is supplied to the mail customer server and the arrival quantity planning system in postal service station where the mail is received.

A grapheme of Korean character is expressed by three bars to represent as many Korean characters as possible. The barcode system of the present invention describes more information than conventional barcode systems by employing a single control code and therefore efficient automatic mail sort is possible. In addition, range of mail sort is extended.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. An automatic mail operation processing system with four-state barcode, comprising:

a customer barcode supporting system for converting information into a four-state barcode and printing the barcode on mail and a mail receiving form when a customer supplies the information;

a mail operation supporting system for receiving the mail and the mail receiving form, determining a postal fee, and reporting a result of receipt to the customer through the customer barcode supporting system; and an automatic sorting system for reading the four-state barcode on the mail and sorting the mail automatically, wherein the information comprises number information and character information, and the number information is expressed by two four-state barcodes having barcode values obtained by the following equation:

$$C_1 = int\left(\frac{Num}{4}\right)$$

$$C_0 = int(Num - 4C_1)$$

where Num is a number represented by barcodes, and the character information is expressed by three four-state barcodes having barcode values obtained by following equation:

$$C_2 = int\left(\frac{Char_v - 63V}{4^2}\right)$$

$$C_1 = int\left(\frac{Char_v - 63V}{4} - 4C_2\right)$$

$$C_0 = int(Char_v - 63V - 4^2C_2 - 4C_1)$$

where $Char_v$ is a code value assigned to characters, and V is priority information.

2. The automatic mail operation processing system of claim 1, wherein the customer barcode supporting system comprises:

customer address management means for providing address information, service type, service level, quantity, and reference weight to the mail operation supporting system and receiving postal code and delivery sequence number, address information, service type, service level, quantity, and reference weight provided by customer, the postal code and the delivery sequence number obtained from the address information;

four-state barcode reference table for storing barcode values of numbers and alphabets;

four state barcode generating means for converting information of mail receiving form and information of automatic sort into four state barcode characters in reference to the four-state barcode reference table; and four-state barcode image printing means for printing the four state barcode characters on mail receiving form and mail.

3. The automatic mail operation processing system of claim 2, wherein the four state barcode generating means generates barcode characters for error correction with the four state barcode characters.

4. The automatic mail operation processing system of claim 3, wherein the four state barcode generating means adds the four state barcode characters, divides result of the addition by 64, and expresses residue of the division with three four-state barcodes.

5. The automatic mail operation processing system of claim 1, wherein the mail operation supporting system comprises:

barcode reading means for receiving mail and mail receiving form from the customer barcode supporting system and reading four state barcodes printed on the mail and the mail receiving form;

measuring means for measuring weight of the mail; and mail window system for determining discount availability of postal fee on the basis of error occurrences in reading the four state barcode, calculating postal fee on the basis of the weight of the mail and result of the barcode reading means, confirming if the postal fee is paid, and providing the mail and information regarding the mail to the automatic sorting system.

6. The automatic mail operation processing system of claim 1, wherein the automatic sorting system comprises:

barcode reading means for reading postal code and delivery sequence number of shipping address from number information section of four state barcode printed on the mail;

storage means for storing the result of the barcode reading means; and distributing means for distributing the mail on the basis of the postal code and the delivery sequence number.

7. The automatic mail operation processing system of claim 1, wherein the customer barcode supporting system comprises customer address management means for providing address information, service type, service level, quantity, and reference weight to the mail operation supporting system and receiving postal code and delivery sequence number, address information, service type, service level, quantity, and reference weight provided by customer, the postal code and the delivery sequence number obtained from the address information;

four-state barcode reference table for storing barcode values of numbers and alphabets;

four state barcode generating means for converting information of mail receiving form and information of automatic sort into four state barcode characters in reference to the four-state barcode reference table; and four-state barcode image printing means for printing the four state barcode characters on mail receiving form and mail, the mail operation supporting system comprises:

barcode reading means for receiving mail and mail receiving form from the customer barcode supporting system and reading four state barcodes printed on the mail and the mail receiving form;

measuring means for measuring weight of the mail; and mail window system for determining discount availability of postal fee on the basis of error occurrences in reading the four state barcode, calculating postal fee on the basis of the weight of the mail and result of the barcode reading means, confirming if the postal fee is paid, and providing the mail and information regarding the mail to the automatic sorting system, the automatic sorting system comprises:

barcode reading means for reading postal code and delivery sequence number of shipping address from number information section of four state barcode printed on the mail;

storage means for storing the result of the barcode reading means; and distributing means for distributing the mail on the basis of the postal code and the delivery sequence number.

* * * * *